Patented Aug. 10, 1948

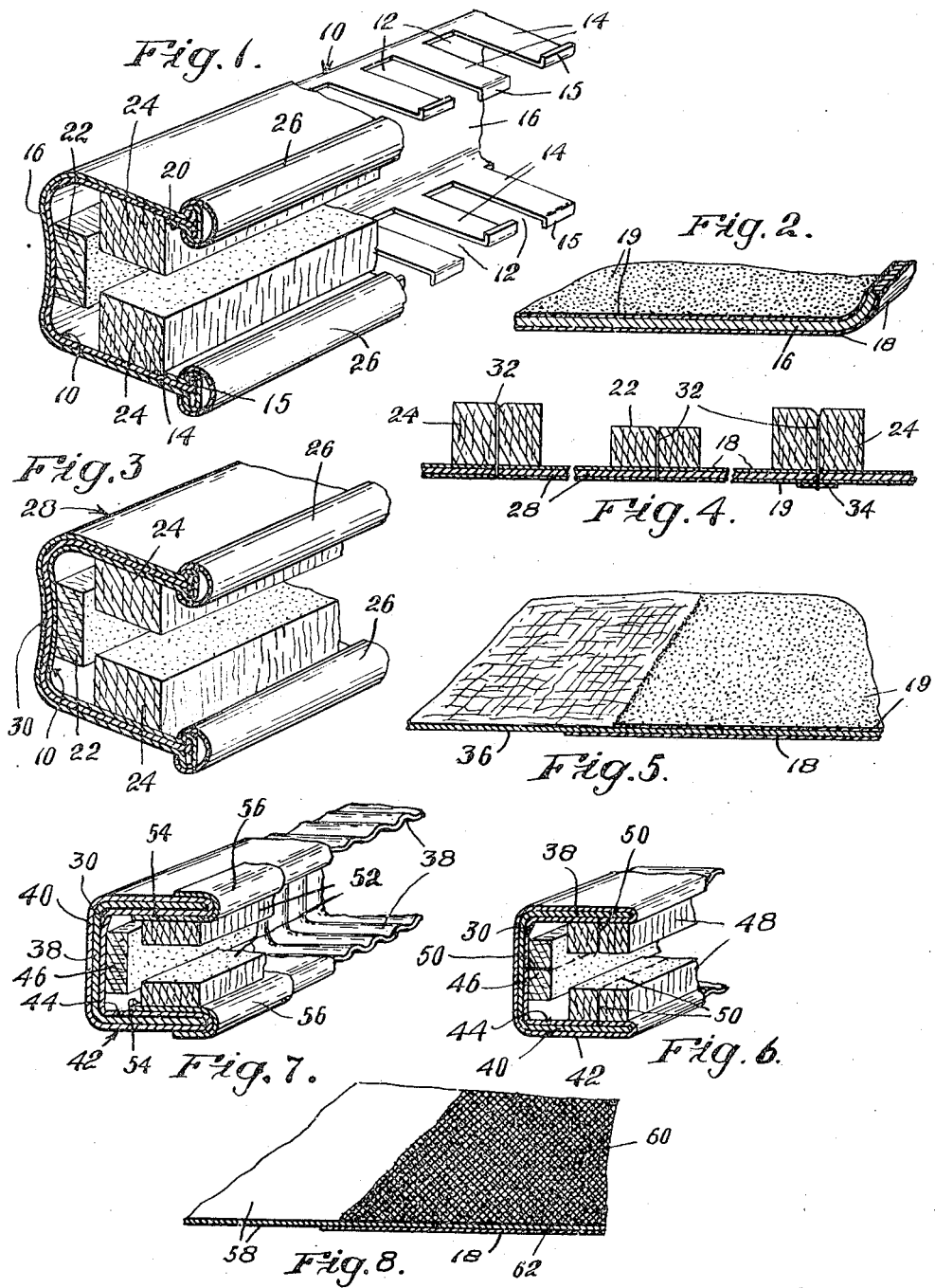

2,446,516

UNITED STATES PATENT OFFICE 2,446,516

WINDOW GLASS CHANNEL GUIDE

David C. Bailey, Amesbury, Mass., assignor to The Bailey Company, Inc., Amesbury, Mass., a corporation of Massachusetts Application June 6, 1946, Serial No. 674,913

11 Claims. (Cl. 296—44.5)

This invention relates to improvements in window glass channel guides such as are used in vehicle bodies and the like. More particularly it provides improvements in channel guides of the general variety disclosed in my Patent No. 1,903,541, granted April 11, 1933.

Window guides of the general channel type to which the invention relates have a sheet metal body formed into generally channel shape with a covering for the metal, which covering carries the strips of felt or pile fabric which bear against opposite side margins of the glass and against the adjacent edges of the glass to provide a cushioned runway in which the window glass is maintained against rattling, and in which the glass may be operated to open and to close the window.

In my said patented construction, the channel-shaped metal body has its opposite side walls deeply notched to provide spaced flat tongues of metal whose spacing permits the metal body to be bent as desired to shape the channel for extending along curved portions of a window and around relatively sharp corners. The metal channel body, as disclosed in my said patent, has a fabric covering sheet completely enclosing the metal body with suitable cushioning strips interiorly of the channel. Each edge of the channel is finished by a bead strip rolled over the covered edge of the channel, each tongue of metal having an off-set end portion under which the bead strip engages to hold the bead strip in place. The bead strips, however, must be free to slip relative to the engaged edges of the channel body to permit bending of the channel at curved regions of a window and at corners.

Experience has shown that fabric covered metal window glass channels have particular disadvantages. The fabric absorbs and holds moisture for considerable periods of time. Hence, when the fabric gets wet, as when a car is washed, or due to rain water running in around the channel, it holds its moisture in contact with the metal of the channel and with metal parts of the vehicle body causing serious corrosion and eating away of the metal.

Also, the fabric covering material readily absorbs the adhesives applied to the inner surface of the fabric which is adhered to the metal surfaces of the channel body, and frequently the adhesive goes through the fabric to its outer side and interferes with a desired freedom of the bead strips to slip relative to the covered edges of the side tongues of the channel body. Actually the bead strips not infrequently become securely cemented against slip by adhesive which has seeped from the inner to the outer side of the fabric covering.

It is among the objects of my present invention to provide a window glass channel having a wrapped generally channel-shaped metal body in which the wrapper effectively protects the metal body against moisture and exteriorly effectively sheds moisture as distinguished from absorbing and holding it in contact with metal parts of a vehicle body.

Another object is to provide a wrapped generally channel-shaped metal window glass guide wherein the wrapper has a smooth resin-coated exterior surface which is moisture-proof and which permits free slipping of the channel bead strips in contact therewith.

A further object is to provide a channel guide for window glass wherein a generally channel-shaped metal body has its surfaces exteriorly of the channel covered with a moisture impervious fibrous sheet which extends inward over the edges of the metal body, and cushioning strips interiorly of the channel are secured directly to the metal surfaces of the body, with the inturned edges of the fibrous sheet butted against opposite ones of the cushioning strips.

Still another object is to provide a wrapped channel guide having its wrapper made of paper impregnated with a substance which increases the tensile strength of the paper and renders it moisture resistant, and superficially coated on its side next to the channel body with a tacky adhesive and superficially coated on its exterior surface with a resinous substance providing a smooth non-tacky moisture-proof surface.

It is, moreover, my purpose and object generally to improve the structure and effectiveness of window glass channel guides and more especially such guides having a wrapped generally channel-shaped metal body.

In the accompanying drawing:

Fig. 1 is a perspective view showing a fragment of one form of channel guide embodying features of the invention;

Fig. 2 is a perspective view of a fragment of the covering sheet of Fig. 1 with thicknesses of the sheet body and its surface coatings exaggerated;

Fig. 3 is a perspective view of a fragment of another embodiment of the invention;

Fig. 4 is a cross-sectional view of the covering sheet of Fig. 3 with cushioning strips stitched thereto;

Fig. 5 is a perspective view of a fragment of a modified form of covering sheet having a body of crossing long fibres organized in paper sheet form, impregnated and coated similarly to the other covering sheets;

Fig. 6 is a fragmentary perspective view of another form of channel guide having a corrugated channel body and embodying features of the invention;

Fig. 7 is a view similar to Fig. 6 but having pile fabric providing oppositely disposed cushioning strips interiorly of the channel; and Fig. 8 is a perspective view of a fragment of another modified form of covering sheet having a body of kraft paper coated on one side with resin and having a sheet of cotton scrim or the like adhered to its other side by asphalt which permeates the cotton sheet.

Referring to the drawing, and more particularly to Figs. 1 and 2, the channel guide has the generally channel-shaped sheet metal body indicated generally at 10 whose opposite side walls are deeply grooved as at 12 to provide the spaced flat tongues 14 whose extreme ends are off-set a little at 15 alternately to one side and the other for a purpose which later will appear. This grooving of the metal side walls of the channel body facilitates bending of the channel to accommodate curved portions and corners of window glass and window frames. Preferably the body 10 is cold rolled steel with a galvanized film or coating thereon, and the opposite surfaces thereof, subsequent to formation of the grooves and tongues, preferably are coated with a slow-drying tacky rubber cement or the like.

According to the invention, the metal channel body 10 has its exterior surfaces and the channel edges covered with a fibrous sheet 16 which conveniently and economically may be a sheet of paper stock impregnated with a suitable substance which increases the tensile strength of the fibrous sheet and which also renders it moisture resistant. The paper preferably will be a good grade of long-fibred sulphite stock or of long-fibred rope stock. It may be desirable, however, to provide a specially prepared sheet of long cotton fibres organized according to paper-making procedures, but with fibres arranged both lengthwise and crosswise of the sheet as in Fig. 5, for providing substantially equal tensile strength in directions along and across the sheet. In any case, the basic fibrous sheet preferably is impregnated with a substance to improve both its tensile strength and its resistance to moisture. For example, the fibrous sheet may be passed through a water dispersion or solution of latex or melamine, or latex, melamine or other comparable agent may be otherwise disseminated throughout the sheet according to well known impregnating procedures. The impregnated sheet 16 may be dried to any extent desired and preferably is calendered and then is superficially coated on one side with a substance providing a low coefficient of surface friction. This coating, indicated at 18 in Fig. 2, is on the side of the sheet which will be exposed in the covered channel, being preferably a coating of a suitable resin applied as a dispersion or solution, such as, for example, a dispersion or solution of a vinyl or urea resin or pyroxylin, methacrylate or acetate resin or compounds thereof. The coating 18, in addition to providing a smooth surface having a low coefficient of friction, is moisture impervious so that it sheds water and is quick-drying when water comes in contact therewith.

The other side of the impregnated fibrous sheet 16 is superficially coated, as at 19 in Fig. 2, with an adhesive which preferably is slow-drying and indefinitely tacky. The adhesive may be, for example, a suitable compound of rubber which may be a reclaimed rubber treated to provide a desired long-lasting tackiness, so that, when the coated sheet 16 is applied to the metal body 10, this tacky surface contacts the tacky surface of the metal and strongly adheres thereto.

In the embodiment of Fig. 1, the coated sheet 16 covers the entire exterior of the channel body 10 and has its opposite margins turned inward over the ends of the tongues 14 and extending down a little interiorly of the channel as at 20.

The usual cushioning strips 22 and 24 are mounted interiorly of the channel, they being coated on one surface with a tacky rubber cement so that when this surface is pressed against the similarly tacky surface of the metal, a satisfactory bond is attained. As shown in Fig. 1, the inturned margins 20 of the cover sheet terminate at the oppositely disposed cushioning strips 24.

The edges of the covered channel of Fig. 1 are finished by having applied thereto the bead strips 26 which may be of stainless steel clinched under the covered off-set ends 15 of the tongues 14, with the clinched edges of the bead strips engaging the smooth resin-coated exterior 18 of the covering sheet so that the bead is free to slip as needed relative to the covered tongues 14, as when the channel is bent to fit a curved region or corner, with no possibility of the cement applied to the interior surface of the sheet seeping through to interfere with the free relative slipping of the bead strips. Also it will be apparent that the coated covering sheet 16 is moisture impervious and sheds water and quickly drys when contacted by water, rather than absorbing substantial amounts of moisture and holding it in contact with the metal of the channel and metal parts of the vehicle, as has happened with the prior wrapped channel guides.

Furthermore, the coated covering sheet of the invention readily may be colored to correspond with adjacent surfaces of the vehicle so that any inaccuracies of setting or assembling resulting in portions of the covering being exposed may be unnoticeable.

In the embodiment illustrated in Figs. 3 and 4, the covering sheet 28 completely covers both inside and outside surfaces of the metal channel body 10 which latter may be in all respects the same as the channel body 10 of Fig. 1. The covering sheet 28 may be the same as the covering sheet 16 of Figs. 1 and 2, with the same impregnation and surface coatings 18, 19, but wider for extending over the inside as well as the outside surfaces of the metal channel body. The opposite edges of the covering sheet may be butted at 30, or may overlap a little, if desired, either at 30 or at any other location interiorly or exteriorly of the covered unit. In the Fig. 4 form, however, the cushioning strips 22, 24 are secured to the covering sheet either by stitches as indicated at 32 or by a suitable cement such as the rubber cement suggested for securing the cushioning strips in Fig. 1. If desired, a reinforcing strip 34 of paper or fabric may be employed at the exterior of the sheet along each line of stitching 32, as suggested for the cushioning strip furthest to the right in Fig. 4. This form of Fig. 3 has the advantage over the form of Fig. 1 that the metal channel body is completely protected against moisture both inside and outside.

Fig. 5 shows a specially prepared paper-like sheet 36 having long fibres, such as cotton fibres, associated with some fibres crossing others to provide tensile strength in both directions of extent of the fibres. The fibres may be organized according to well known paper-making procedures, and the sheet may be impregnated with a substance, to both improve its tensile strength and moisture resistance, at the time the sheet is made or afterwards by passing it through a bath, or otherwise, as described for the impregnation of the sheet 16 of the Fig. 1 form. The sheet 36 will be provided with coating 18 and 19 the same as the sheets 16 and 28, and may be used for covering a metal channel body in the manner of Fig. 1 or of Fig. 3.

Figs. 6 and 7 illustrate the invention as applied to corrugated metal channel bodies 38 which ordinarily are made of cold rolled steel as in the previously described case, but the corrugations enable bending of the channel and the channel walls may be continuous throughout their extent. No metal bead strips are provided on the channel guides of Figs. 6 and 7, and the covering sheet 40, instead of a resin coating on its exterior surface, has a coating 42 of rubber or the like which has the character of shedding water and being quick-drying, and also it has a sound-deadening effect between the channel and adjacent parts of the vehicle, tending to avoid rattling and buzzing sounds due to vibration when the vehicle is in motion. As in the previously described covering sheets, the sheet 40 preferably is first impregnated with a moisture-proofing substance, as by passing it through a solution or dispersion of latex, after which it is dried as may be desired prior to applying the exterior rubber coating 42 and an interior adhesive coating 44 which may be the same as the inner surface coatings 19 of the previously described covering sheets 16, 28 and 36.

In Fig. 6, the cushioning or lining strips 46, 48 are shown stitched at 50 to the sheet 40 although they may be cemented to sheet 40 as described in connection with Fig. 3.

In Fig. 7, the cushioning strip 46 in the bottom of the channel may be the same as that of Fig. 6, but the lining strips at the sides of the channel are strips of pile 52 on the pile fabric 54, the fabric being free of pile excepting at the regions 52. The fabric is cemented to the rubber coated sheet 40, extending over the edges of the channel as at 56 and providing the finish for these edges. It will be obvious that, in both Figs. 6 and 7, the metal channel body is protected against moisture both inside and outside.

Fig. 8 shows a covering sheet which may have a kraft paper body 58 coated on one side with resin 18, as in the other forms, and having its other side covered with a sheet of cotton scrim 60 adhered to the paper by asphalt 62 which more or less permeates the cotton sheet.

Frequently it happens that channel guides are installed with inaccuracy of fit such that portions of the channel walls inward of the edges become exposed. According to the invention, the covering sheets are adapted to be readily colored to match adjacent parts of the vehicle so that any such exposed portions of channel walls are inconspicuous and unnoticeable.

I claim as my invention:

1. A window glass guide comprising a metallic generally channel-shaped bendable strip, a sheet of paper covering at least the exterior surfaces and the longitudinally extending edges of the metallic strip, said paper sheet having a tacky adhesive on its inner surface adhering to the metal, and having a smooth moisture impervious coating on its outer surface providing exterior surfaces which shed water and which are quick-drying when water comes in contact therewith, and cushioning strips secured on the bottom and sides of the channel interiorly thereof, with said paper covering sheet extending over interior surfaces of the channel at least from the longitudinal edges thereof to the cushioning strips at the sides of the channel.

2. A window glass guide comprising a metallic generally channel-shaped bendable strip, a sheet of paper covering the entire surface areas of the channel strip both interiorly and exteriorly thereof and also covering the longitudinally extending edges of the channel strip, said paper having a tacky adhesive on its side which engages the metal strip for securing the paper sheet to the metal, and having a smooth moisture impervious coating on its other side which is exposed interiorly and exteriorly of the channel, said coating being adapted to shed water coming in contact therewith and being quick-drying following such contact with water, and cushioning strips secured to the coated paper sheet on the bottom and sides of the channel interiorly thereof.

3. A window glass guide comprising a metallic generally channel-shaped bendable strip, a sheet of paper covering at least the exterior surfaces and the longitudinally extending edges of the metallic strip, said paper sheet having a tacky adhesive on its inner surface adhering to the metal, and having a coating on its outer surface of a moisture impervious substance having a low coefficient of friction, a bead strip clinched over and along each covered edge of the channel with the edges of the bead strip slidably engaging said coating on the paper, whereby the bead strips are free to slip relative to the side walls of the metal channel strip when the latter is bent, and cushioning strips secured on the bottom and sides of the channel interiorly thereof, with said covering sheet extending under the cushioning strips at the sides of the channel.

4. A window glass guide comprising a metallic generally channel-shaped bendable strip, a sheet of paper impregnated with latex and covering at least the exterior surfaces and the longitudinally extending edges of the metallic strip, said impregnated paper sheet having a tacky adhesive on its inner surface adhering to the metal, and having a resinous coating on its outer surface providing exterior surfaces having the character that they shed water coming in contact therewith, are quick-drying and have a low coefficient of friction, and cushioning strips secured to the bottom and sides of the channel interiorly thereof.

5. A window glass guide comprising a metallic generally channel-shaped bendable strip having its side walls deeply grooved from their edges inward to provide a succession of spaced tongues having their ends off-set alternately in opposite directions, a sheet of paper having relatively long fibres therein and impregnated with a substance having the character that it increases the tensile strength of the paper and renders it moisture resistant, said paper covering at least the exterior surfaces and longitudinally extending edges of the metal strip and having a coating of adhesive on its inner side adhering to the metal and a coating of a resinous moisture impervious substance on its outer surface, said resinous coating having a low coefficient of friction, a bead strip clinched over each of the covered edges of the channel and engaging under said off-set ends of said tongues, said bead strips slidably engaging said resinous coating and being free to slip relative to said tongues when the channel is bent, and cushioning strips secured interiorly of the channel for engaging a window glass extending into the channel.

6. A window glass guide comprising a metallic generally channel-shaped bendable strip having its side walls deeply grooved from their edges inward to provide a succession of spaced tongues having their ends off-set alternately in opposite directions, a sheet of long-fibered paper impregnated with latex and covering both the interior and exterior surfaces of the metal strip and extending over the longitudinally extending edges of the metal strip, said impregnated paper sheet having a slow-drying tacky adhesive coating its inner surface and adhering to the metal, and having an exterior resinous coating having a low coefficient of friction, a bead strip clinched over the longitudinal edges of the channel and slidably engaging back of said off-set ends of said tongues, and slidably engaging the resinous exterior coating on the paper sheet, and cushioning strips secured to the coated paper sheet interiorly of the channel for engaging a window glass.

7. A window glass guide comprising a corrugated metal channel strip, a covering sheet of paper extending over both the interior and exterior surfaces of the channel strip, said paper sheet having a coating of slow-drying tacky adhesive on its inner surface adhering to the metal and having a coating of rubber on its exterior side providing a moisture-proof surface which readily sheds water and eliminates vibratory noises, and cushioning strips secured interiorly of the channel to the bottom and sides of the covered metal channel strip.

8. A window glass guide comprising a corrugated metal channel strip, a covering sheet of paper extending over both the interior and exterior surfaces of the channel strip, said paper sheet being impregnated with a moisture-proofing substance having the character that it materially increases the tensile strength of the paper and having a coating of slow-drying tacky adhesive on its inner side adhering to the metal, a coating of rubber on the exterior side of the paper sheet protecting the paper against moisture and adapted to absorb vibrations and eliminate vibratory noises, and cushioning strips on the bottom and opposite sides of the channel interiorly thereof for resiliently engaging a window glass.

9. A window glass guide comprising a corrugated metal channel strip, a covering sheet of paper extending over both the interior and exterior surfaces of the channel strip, said paper sheet being impregnated with a moisture-proofing substance having the character that it materially increases the tensile strength of the paper and having a coating of slow-drying tacky adhesive on its inner side adhering to the metal, a coating of rubber on the exterior side of the paper sheet protecting the paper against moisture and adapted to absorb vibrations and eliminate vibratory noises, a felt liner strip secured to the covered bottom wall of the channel interiorly of the channel, a pile fabric secured to the coated paper sheet interiorly of each side wall of the channel with a strip of pile on each side wall and with a portion of the fabric which is free of pile extending over each longitudinal edge of the channel as a finishing bead.

10. A window glass guide comprising a metallic generally channel-shaped bendable strip, a sheet covering said strip comprising a sheet of paper faced on its inner side with a textile fabric adhered to the paper by asphalt and faced on its outer side with a resinous coating, said covering sheet covering at least the exterior surfaces of said strip and extending inward over the longitudinal edges of the strip, said textile fabric having an adhesive thereon for adhering the composite covering sheet to said metallic strip.

11. A window glass guide comprising a metallic generally channel-shaped bendable strip, a sheet covering said strip comprising a fibrous sheet having relatively long fibres associated and compacted together with fibres extending both along and across the sheet, said sheet being permeated by a substance having the character that it increases the tensile strength of the sheet and renders the sheet resistant to moisture, there being a coating of a tacky adhesive on one side of the sheet, and a resinous coating on the other side of the sheet, said covering sheet covering at least the exterior surfaces of said strip, with said tacky adhesive coating adhering to the metal, and with said resinous coating exposed as a moisture impervious exteror surface.

DAVID C. BAILEY.

REFERENCES CITED

The following references are of record in the file of this patent:

UNITED STATES PATENTS

| Number | Name | Date |
|---|---|---|
| 1,903,541 | Bailey | Apr. 11, 1933 |
| 1,908,643 | Rice | May 9, 1933 |
| 1,921,484 | Schlegel | Aug. 8, 1933 |
| 2,026,972 | Greene | Jan. 7, 1936 |
| 2,035,760 | Reese | Mar. 31, 1936 |
| 2,102,936 | Bailey | Dec. 21, 1937 |
| 2,142,258 | Schlegel | Jan. 3, 1939 |
| 2,273,684 | Bailey | Feb. 17, 1942 |
| 2,325,584 | Barnhart | Aug. 3, 1943 |
| 2,330,814 | Drew | Oct. 5, 1943 |
| 2,398,400 | Balfe | Apr. 16, 1946 |
| 2,399,204 | Cameron | Apr. 30, 1946 |